(12) United States Patent
Gomi et al.

(10) Patent No.: US 7,567,724 B2
(45) Date of Patent: Jul. 28, 2009

(54) IMAGE PROCESSING APPARATUS, IMAGE PROCESSING METHOD, PROGRAM OF IMAGE PROCESSING METHOD, AND RECORDING MEDIUM IN WHICH PROGRAM OF IMAGE PROCESSING METHOD HAS BEEN RECORDED

(75) Inventors: Shinichiro Gomi, Chiba (JP); Masami Ogata, Kanagawa (JP); Kazuhiko Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 202 days.

(21) Appl. No.: 10/563,919

(22) PCT Filed: Apr. 21, 2005

(86) PCT No.: PCT/JP2005/008106

§ 371 (c)(1),
(2), (4) Date: Jan. 10, 2006

(87) PCT Pub. No.: WO2005/111933

PCT Pub. Date: Nov. 24, 2005

(65) Prior Publication Data

US 2008/0123998 A1    May 29, 2008

(30) Foreign Application Priority Data

May 19, 2004    (JP) ............................. 2004-148991

(51) Int. Cl.
*G06K 9/40* (2006.01)
*G06K 9/48* (2006.01)
*H04N 5/00* (2006.01)

(52) U.S. Cl. .................. 382/261; 382/266; 382/269; 382/199; 382/200; 382/263; 348/610; 348/611; 348/612; 348/613; 348/614; 348/615; 348/616

(58) Field of Classification Search ................. 382/261, 382/269
See application file for complete search history.

(56) References Cited

U.S. PATENT DOCUMENTS

| | | | | |
|---|---|---|---|---|
| 5,072,384 A | * | 12/1991 | Doi et al. ................ | 382/132 |
| 5,373,322 A | * | 12/1994 | Laroche et al. .......... | 348/273 |
| 5,392,137 A | * | 2/1995 | Okubo .................... | 358/462 |
| 5,506,619 A | * | 4/1996 | Adams et al. ............ | 348/272 |
| 5,515,181 A | * | 5/1996 | Iyoda et al. ............. | 358/474 |
| 5,600,731 A | * | 2/1997 | Sezan et al. ............. | 382/107 |
| 5,668,888 A | * | 9/1997 | Doi et al. ................ | 382/132 |
| 5,771,318 A | * | 6/1998 | Fang et al. .............. | 382/261 |
| 5,798,830 A | * | 8/1998 | Srinivasan .............. | 356/237.2 |

(Continued)

FOREIGN PATENT DOCUMENTS

JP    55-133179    10/1980

(Continued)

*Primary Examiner*—Vikkram Bali
*Assistant Examiner*—Michelle Entezari
(74) *Attorney, Agent, or Firm*—Finnegan, Henderson, Farabow, Garrett & Dunner, L.L.P.

(57) ABSTRACT

The present invention is applied, for example, to resolution conversion. An edge gradient direction v1 with the largest gradient of pixel values and an edge direction v2 orthogonal to the edge gradient direction v1 are detected. Edge enhancement and smoothing processing are performed in the edge gradient direction v1 and in the edge direction v2, respectively, to generate output image data D2.

8 Claims, 6 Drawing Sheets

U.S. PATENT DOCUMENTS

| | | | | |
|---|---|---|---|---|
| 5,808,735 | A * | 9/1998 | Lee et al. | 356/237.2 |
| 5,867,592 | A * | 2/1999 | Sasada et al. | 382/154 |
| 5,870,103 | A * | 2/1999 | Luo | 345/630 |
| 5,903,660 | A * | 5/1999 | Huang et al. | 382/132 |
| 5,930,007 | A * | 7/1999 | Kojima | 358/464 |
| 5,960,371 | A * | 9/1999 | Saito et al. | 702/11 |
| 6,144,697 | A * | 11/2000 | Gelfand et al. | 375/233 |
| 6,337,925 | B1 * | 1/2002 | Cohen et al. | 382/199 |
| 6,388,706 | B1 * | 5/2002 | Takizawa et al. | 348/273 |
| 6,445,832 | B1 * | 9/2002 | Lee et al. | 382/266 |
| 6,463,167 | B1 * | 10/2002 | Feldman et al. | 382/128 |
| 6,678,405 | B1 * | 1/2004 | Kondo et al. | 382/159 |
| 6,681,053 | B1 * | 1/2004 | Zhu | 382/258 |
| 6,718,072 | B1 * | 4/2004 | Sekiya et al. | 382/298 |
| 6,735,341 | B1 * | 5/2004 | Horie et al. | 382/239 |
| 6,757,442 | B1 * | 6/2004 | Avinash | 382/274 |
| 6,778,698 | B1 * | 8/2004 | Prakash et al. | 382/164 |
| 7,158,632 | B2 * | 1/2007 | Thirumoorthy | 379/406.08 |
| 7,379,626 | B2 * | 5/2008 | Lachine et al. | 382/300 |
| 2002/0159650 | A1 * | 10/2002 | Hiroshige et al. | 382/261 |
| 2002/0167602 | A1 * | 11/2002 | Nguyen | 348/280 |
| 2003/0053161 | A1 * | 3/2003 | Li et al. | 358/532 |
| 2003/0107770 | A1 * | 6/2003 | Klatchko et al. | 358/3.21 |
| 2003/0185420 | A1 * | 10/2003 | Sefcik et al. | 382/103 |
| 2003/0190075 | A1 * | 10/2003 | Averbuch et al. | 382/199 |
| 2004/0119884 | A1 * | 6/2004 | Jiang | 348/448 |
| 2004/0190787 | A1 * | 9/2004 | Nakami | 382/260 |
| 2005/0002570 | A1 * | 1/2005 | Clark et al. | 382/199 |
| 2005/0036689 | A1 * | 2/2005 | Mahdavieh | 382/199 |
| 2005/0134730 | A1 * | 6/2005 | Winger et al. | 348/448 |
| 2005/0201616 | A1 * | 9/2005 | Malvar et al. | 382/167 |
| 2006/0140497 | A1 * | 6/2006 | Kondo et al. | 382/254 |
| 2006/0291741 | A1 * | 12/2006 | Gomi et al. | 382/266 |

FOREIGN PATENT DOCUMENTS

| | | |
|---|---|---|
| JP | 06-195457 | 7/1994 |
| JP | 06-348842 | 12/1994 |
| JP | 07-262368 | 10/1995 |
| JP | 08-022539 | 1/1996 |
| JP | 2003-224715 | 8/2003 |

* cited by examiner

IMAGE PROCESSING APPARATUS, IMAGE PROCESSING METHOD, PROGRAM OF IMAGE PROCESSING METHOD, AND RECORDING MEDIUM IN WHICH PROGRAM OF IMAGE PROCESSING METHOD HAS BEEN RECORDED

TECHNICAL FIELD

The present invention relates to image progressing apparatuses, image processing methods, programs for image processing methods, and recording media recording thereon programs for image processing methods, and is applicable, for example, to resolution conversion. The present invention is capable of effectively avoiding loss of high-frequency components and preventing occurrence of jaggies by detecting an edge gradient direction with the largest gradient of pixel values and an edge direction orthogonal to the edge gradient direction and by performing edge enhancement and smoothing processing in the edge gradient direction and in the edge direction, respectively, to generate output image data.

BACKGROUND OF THE INVENTION

Background Art

In image processing, resolution conversion has been performed, for example, by linear interpolation or bicubic conversion. A method for performing such image processing with a simplified configuration is proposed, for example, in Japanese Unexamined Patent Application Publication No. 2003-224715.

However, in such image processing, jaggies occur in edge portions. When a characteristic of linear interpolation or bicubic conversion is set such that jaggies do not stand out, there is a problem that high-frequency components of an image are lost and that the image is blurred due to a reduction in the sharpness. Since considerable image blur occurs in texture portions, the characteristic of such processing may be changed in the texture portions. However, in this case, heterogeneity and flickering occur in positions where the characteristic is changed.

DISCLOSURE OF INVENTION

The present invention is designed in view of the foregoing points, and proposes an image processing apparatus, an image processing method, a program for an image processing method, and a recording medium recording thereon a program for an image processing method that are capable of effectively avoiding loss of high-frequency components and preventing occurrence of jaggies.

In order to solve the above problems, the present invention is applied to an image processing apparatus for processing input image data and for outputting output image data. The image processing apparatus includes an edge detection unit for detecting an edge gradient direction with the largest gradient of pixel values and an edge direction orthogonal to the edge gradient direction for each pixel of the input image data; an edge direction processing unit for performing smoothing processing on the image data in the edge direction for each pixel of the output image data in accordance with a detection result of the edge detection unit and for sequentially detecting pixel values corresponding to respective pixels of the output image data; and an edge gradient direction processing unit for performing edge enhancement processing in the edge gradient direction on the pixel values output from the edge direction processing unit for the respective pixels of the output image data in accordance with the detection result of the edge detection unit and for sequentially outputting pixel values of the output image data.

The configuration according to the present invention is applied to an image processing apparatus for processing input image data and for outputting output image data. The image processing apparatus includes an edge detection unit for detecting an edge gradient direction with the largest gradient of pixel values and an edge direction orthogonal to the edge gradient direction for each pixel of the input image data; an edge direction processing unit for performing smoothing processing on the image data in the edge direction for each pixel of the output image data in accordance with a detection result of the edge detection unit and for sequentially detecting pixel values corresponding to respective pixels of the output image data; and an edge gradient direction processing unit for performing edge enhancement processing in the edge gradient direction on the pixel values output from the edge direction processing unit for the respective pixels of the output image data in accordance with the detection result of the edge detection unit and for sequentially outputting pixel values of the output image data. Thus, edge enhancement and smoothing processing are performed in the edge gradient direction with the largest gradient of pixel values and in the edge direction orthogonal to the edge gradient direction, respectively, to generate the output image data. Therefore, loss of high-frequency components can be effectively avoided, and occurrence of jaggies can be prevented.

In addition, the present invention is applied to an image processing method for processing input image data and for outputting output image data. The image processing method includes an edge detection step of detecting an edge gradient direction with the largest gradient of pixel values and an edge direction orthogonal to the edge gradient direction for each pixel of the input image data; an edge direction processing step of performing smoothing processing on the image data in the edge direction for each pixel of the output image data in accordance with a detection result by the edge detection step and sequentially detecting pixel values corresponding to respective pixels of the output image data; and an edge gradient direction processing step of performing edge enhancement processing in the edge gradient direction on the pixel values detected by the edge direction processing step for the respective pixels of the output image data in accordance with the detection result by the edge detection step and sequentially outputting pixel values of the output image data.

Thus, with the configuration according to the present invention, an image processing method capable of effectively avoiding loss of high-frequency components and preventing occurrence of jaggies can be provided.

In addition, the present invention is applied to a program for an image processing method performed by arithmetic processing means for processing input image data and for outputting output image data. The program includes an edge detection step of detecting an edge gradient direction with the largest gradient of pixel values and an edge direction orthogonal to the edge gradient direction for each pixel of the input image data; an edge direction processing step of performing smoothing processing on the image data in the edge direction for each pixel of the output image data in accordance with a detection result by the edge detection step and sequentially detecting pixel values corresponding to respective pixels of the output image data; and an edge gradient direction processing step of performing edge enhancement processing in the edge gradient direction on the pixel values detected by the edge direction processing step for the respective pixels of the output image data in accordance with the detection result by the edge detection step and sequentially outputting pixel values of the output image data.

Thus, with the configuration according to the present invention, a program for an image processing method capable of effectively avoiding loss of high-frequency components and preventing occurrence of jaggies can be provided.

In addition, the present invention is applied to a recording medium recording thereon a program for an image processing method performed by arithmetic processing means for processing input image data and for outputting output image data. The program for the image processing method includes an edge detection step of detecting an edge gradient direction with the largest gradient of pixel values and an edge direction orthogonal to the edge gradient direction for each pixel of the input image data; an edge direction processing step of performing smoothing processing on the image data in the edge direction for each pixel of the output image data in accordance with a detection result by the edge detection step and sequentially detecting pixel values corresponding to respective pixels of the output image data; and an edge gradient direction processing step of performing edge enhancement processing in the edge gradient direction on the pixel values detected by the edge direction processing step for the respective pixels of the output image data in accordance with the detection result by the edge detection step and sequentially outputting pixel values of the output image data.

Thus, with the configuration according to the present invention, a recording medium recording thereon a program for an image processing method capable of effectively avoiding loss of high-frequency components and preventing occurrence of jaggies can be provided.

According to the present invention, loss of high-frequency components can be effectively avoided and occurrence of jaggies can be prevented.

BEST MODE FOR CARRYING OUT THE INVENTION

Figure 1:
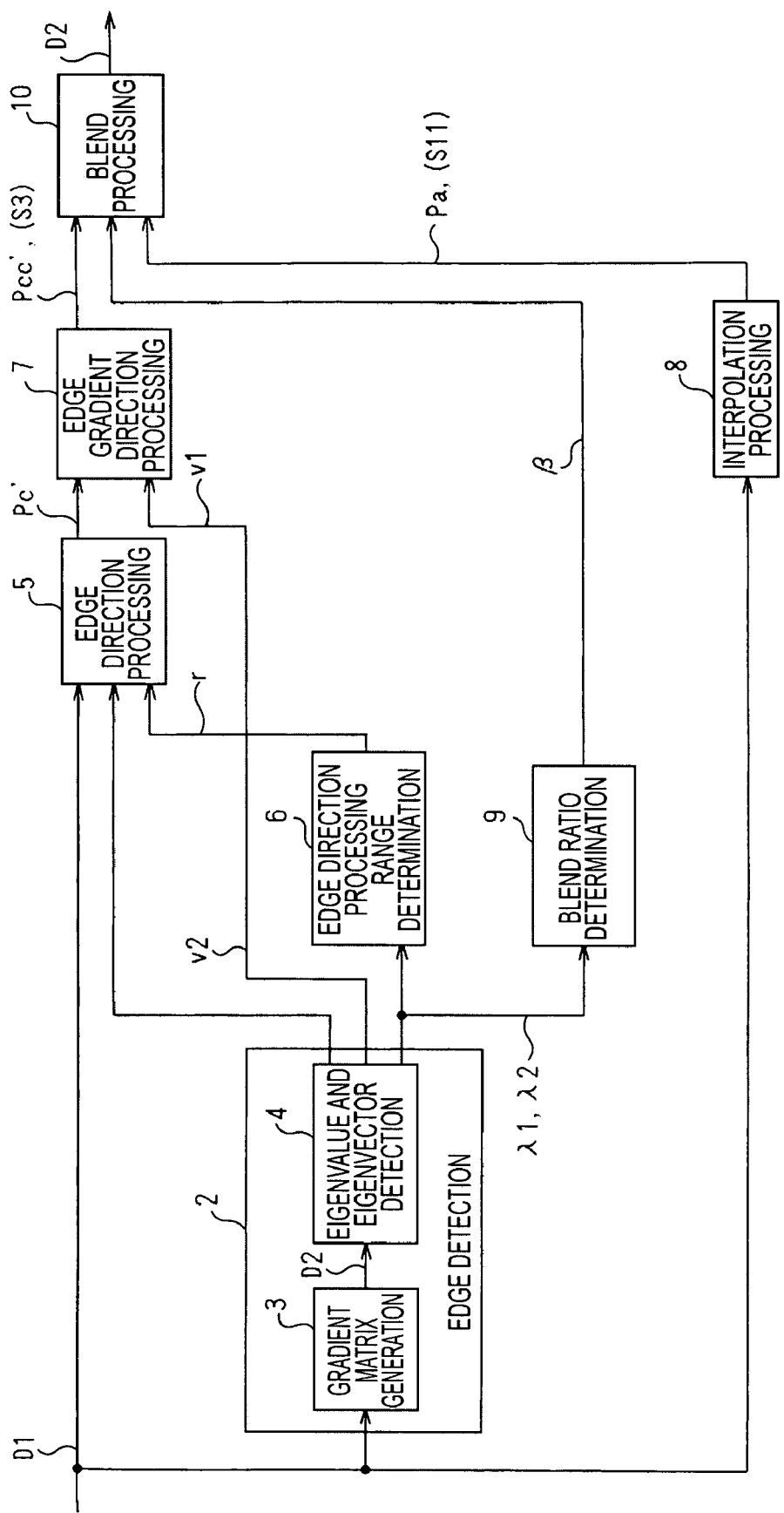
FIG. 1 is a functional block diagram showing the configuration of an image processing apparatus according to an embodiment of the present invention.

Embodiments of the present invention will be described by appropriately referring to the drawings.

(1) Configuration of Embodiment

FIG. 1 is a functional block diagram showing an image processing apparatus according to an embodiment of the present invention. The image processing apparatus 1 is formed by, for example, a digital signal processor functioning as arithmetic processing means. By a predetermined processing program performed by the arithmetic processing means, the resolution of image data D1, which is input image data, is converted into a resolution designated by a controller, which is not shown, and the converted image data is output. Accordingly, the image processing apparatus 1 generates output image data D2 obtained by magnifying or reducing an image based on the image data D1, and outputs the generated output image data D2 to displaying means or the like.

Although the processing program for the arithmetic processing means is supplied by being pre-installed in the image processing apparatus in this embodiment, for example, such a processing program may be supplied by being downloaded via a network, such as the Internet, or may be supplied via various recording media. Such recording media may be widely applicable to various recording media, such as optical disks, memory cards, and detachable hard disk drives.

Figure 2:
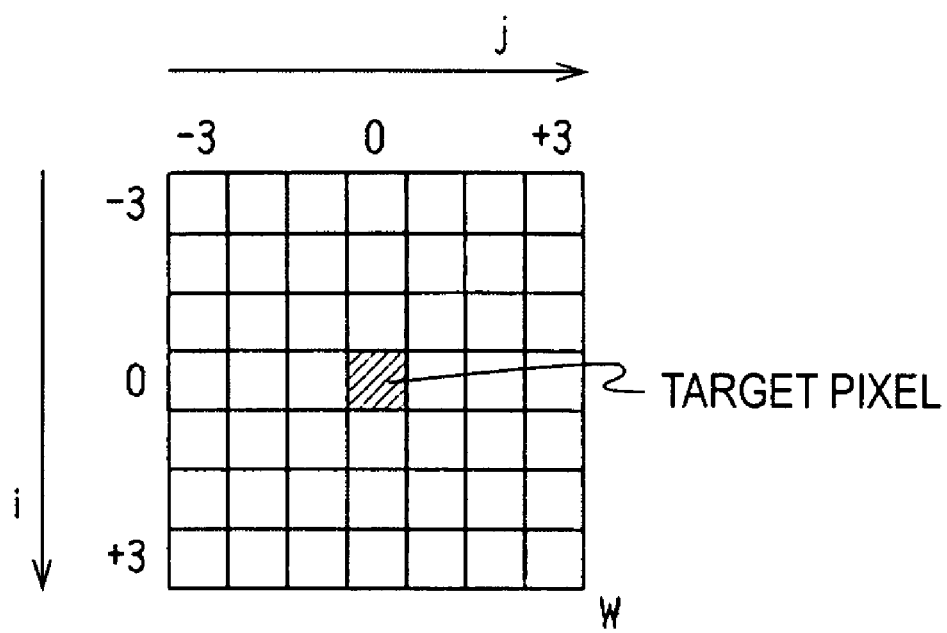
FIG. 2 is a schematic diagram for generation of a pixel gradient matrix.

In the image processing apparatus 1, an edge detection unit 2 detects an edge gradient direction with the largest gradient of pixel values and an edge direction orthogonal to the edge gradient direction for each pixel of the image data D1. In other words, in the edge detection unit 2, a gradient matrix generation unit 3 sequentially selects a target pixel, for example, in a raster scanning order, and, as shown in FIG. 2, generates a brightness gradient matrix G represented by the next condition by performing arithmetic processing using pixel values in a range W centered on the target pixel. FIG. 2 shows an example in which ±3 pixels in x and y directions centered on a target pixel are set as the range W.

$$G = \int_W gg^T w dA \qquad (1)$$
$$= \sum_W \begin{pmatrix} g_x^{(i,j)} g_x^{(i,j)} w^{(i,j)} & g_x^{(i,j)} g_y^{(i,j)} w^{(i,j)} \\ g_x^{(i,j)} g_y^{(i,j)} w^{(i,j)} & g_y^{(i,j)} g_y^{(i,j)} w^{(i,j)} \end{pmatrix}$$
$$\equiv \begin{pmatrix} G_{xx} & G_{xy} \\ G_{xy} & G_{yy} \end{pmatrix}$$

In addition, "$w^{(i,j)}$" represents a Gaussian weight represented by condition (2), and "g" represents a brightness gradient represented by condition (3) using a partial differential "gx" in the x direction of an image brightness I and a partial differential "gy" in the y direction of the image brightness I.

$$w^{(i,j)} = \exp\left(-\frac{i^2 + j^2}{2\sigma^2}\right) \qquad (2)$$

$$g = (g_x, g_y) \qquad (3)$$
$$= \left(\frac{\partial I}{\partial x}, \frac{\partial I}{\partial y}\right)$$

Accordingly, in the edge detection unit 2, the gradient matrix generation unit 3 detects a brightness gradient obtained by weighting based on a target pixel in the predetermined range W centered on the target pixel.

Figure 3:
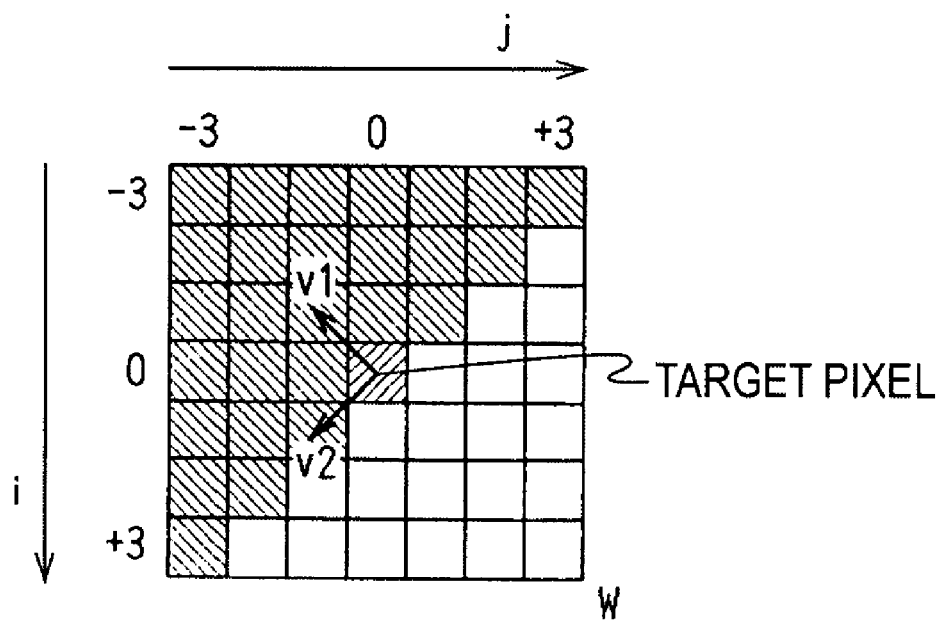
FIG. 3 is a schematic diagram for explaining an edge gradient direction and an edge direction.

In the edge detection unit 2, a subsequent eigenvalue and eigenvector detection unit 4 detects an edge gradient direction v1 with the largest gradient of pixel values and an edge direction v2 orthogonal to the edge gradient direction v1 for a target pixel, as shown in FIG. 3, by processing the brightness gradient matrix G generated by the gradient matrix generation unit 3. In addition, the eigenvalue and eigenvector detection unit 4 detects eigenvalues λ1 and λ2 representing dispersions of gradients of the pixel values in the edge gradient direction v1 and in the edge direction v2, respectively.

More specifically, the eigenvalue and eigenvector detection unit 4 detects the edge gradient direction v1, the edge direction v2, and the eigenvalues λ1 and λ2 (λ1≧λ2) in accordance with the following arithmetic processing:

$$\lambda 1 = \frac{G_{xx} + G_{yy} + \sqrt{a}}{2} \quad (4)$$

$$\lambda 2 = \frac{G_{xx} + G_{yy} - \sqrt{a}}{2} \quad (5)$$

$$v1 = \frac{v'1}{\|v'1\|}$$

$$v'1 = \left(\frac{G_{xx} - G_{yy} + \sqrt{a}}{2G_{xy}}, 1\right) \quad (6)$$

$$v2 = \frac{v'2}{\|v'2\|}$$

$$v'2 = \left(\frac{G_{xx} - G_{yy} - \sqrt{a}}{2G_{xy}}, 1\right), \quad (7)$$

where "a" is defined by the following condition:

$$a = G_{xx}^2 + 4G_{xy}^2 - 2G_{xx}G_{yy} + G_{yy}^2 \quad (8)$$

An edge direction processing unit 5 calculates an edge direction vc for a pixel of the image data D2 acquired after resolution conversion in accordance with the edge direction v2 for a target pixel of the image data D1 detected as described above by the edge detection unit 2, and sequentially calculates a pixel value corresponding to each pixel Pc of the output image data D2 by interpolation processing based on the edge direction vc.

Figure 4:
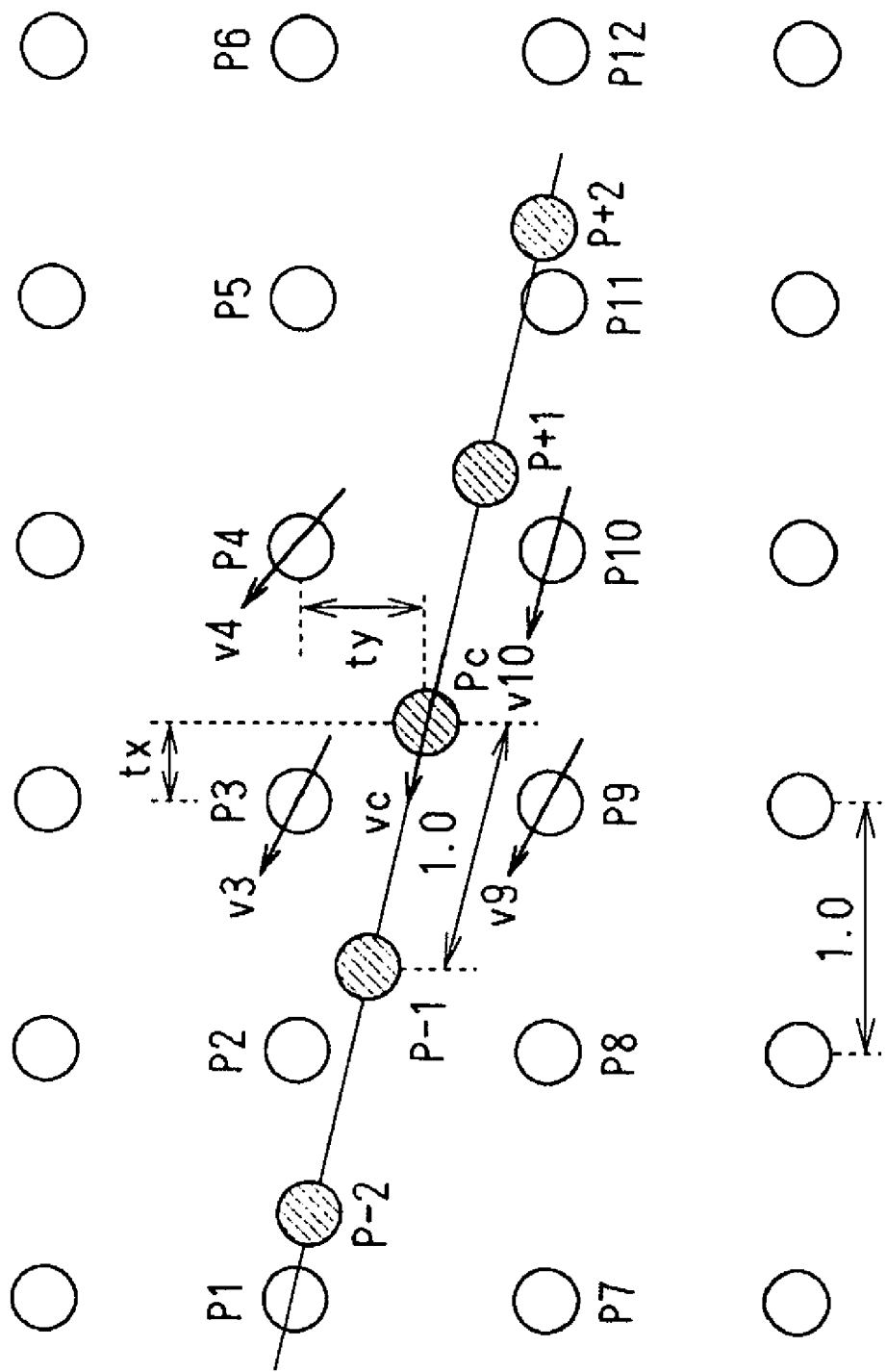
FIG. 4 is a schematic diagram for explaining an operation of an edge direction processing unit.

In other words, as shown in FIG. 4, the edge direction processing unit 5 performs arithmetic processing based on the next condition for pixels of the image data D1 (in the example shown in FIG. 4, P3, P4, P9, and P10) adjacent to a pixel Pc of the output image data D2 to be calculated (hereinafter, referred to as a target pixel of the image data D2), and calculates the edge direction vc of the target pixel Pc by performing interpolation processing using the edge directions v2 (v3, v4, v9, and v10) of the adjacent pixels of the image data D1.

$$v_c = (1-t_y)((1-t_x)v_3 + t_xv_4) + t_y((1-t_x)v_9 + t_xv_{10}) \quad (9)$$

Here, "$t_x$" and "$t_y$" represent coordinate values of a target pixel for internally dividing the sampling points P3, P4, P9, and P10 based on the image data D1 in the x and y directions, and the conditions $0 \leq t_x \leq 1$ and $0 \leq t_y \leq 1$ are satisfied.

In addition, in accordance with the edge direction vc for the target pixel Pc calculated as described above, the edge direction processing unit 5 sets a predetermined number of sampling points P--2, P--1, P1, and P2 based on a sampling pitch in the image data D1 from the sampling points for the target pixel Pc on a line in the edge direction vc. In addition, pixel values of the sampling points P--2, P--1, P1, and P2 and the target pixel Pc are calculated by an interpolation operation using pixel values of the image data D1. Accordingly, in accordance with detection results of the edge detection unit 2, interpolated image data in the edge direction based on interpolation processing for the input image data D1 is generated on the line extending in the edge direction vc for each pixel of the output image data D2.

In addition, in accordance with a calculation result of an edge direction range determination unit 6, which will be described below, the number of sampling points set as described above is changed, and the subsequent filtering processing is changed. Thus, the number of taps for the filtering processing is changed in accordance with reliability of an edge in the edge direction vc of the target pixel. More specifically, for example, in a case where the subsequent filtering processing is performed based on 3-tap filtering, a pixel value of the target pixel Pc is calculated by linear interpolation using the peripheral pixels P3, P4, P9, and P10, and pixel values of the previous and subsequent sampling points P--1 and P1 are calculated by linear interpolation using P2, P3, P8, and P9; and P4, P5, P10, and P11, respectively. In contrast, in a case where the subsequent filtering processing is performed based on 5-tap filtering, a pixel value of the target pixel Pc is calculated by linear interpolation using the peripheral pixels P3, P4, P9, and P10, and pixel values of the sampling points P--2, P--1, P1, and P2 are calculated in a similar way.

Then, the edge direction processing unit 5 smoothes the calculated pixel values of the sampling points P--2, P--1, P1, and P2 and the target pixel Pc by filtering processing, and determines a pixel value Pc' of the target pixel Pc. In other words, for 3-tap filtering, for example, the pixel value Pc' of the target pixel Pc is calculated by arithmetic processing represented by the following condition:

$$P'_C = 0.25 \times P_{-1} + 0.5 \times P_C + 0.25 \times P_{+1} \quad (10)$$

In contrast, for 5-tap filtering, for example, the pixel value Pc' of the target pixel Pc is calculated by arithmetic processing represented by the following condition:

$$P'_c = 0.0625 \times P_{-2} + 0.25 \times P_{-1} + 0.375 \times P_c + 0.25 \times P_{+1} + 0.0625 \times P_{+2} \quad (11)$$

As described above, in this embodiment, a pixel value corresponding to a pixel of the output image data D2 is calculated by performing smoothing processing on interpolated image data in an edge direction. Thus, loss of high-frequency components can be effectively avoided and occurrence of jaggies in an edge can be prevented. In addition, an interpolation operation for generating such interpolated image data need not be linear interpolation using pixel values of adjacent neighboring pixels, and various interpolation operation methods using various peripheral pixels are widely applicable. In addition, arithmetic processing for filtering processing using the interpolated image data need not be the arithmetic processing based on condition (10) or (11), and interpolation operations using various weighting coefficients are widely applicable.

In a case where pixel values in the image data D2 are calculated by detecting edge directions for respective pixels as described above, smoothing processing may be performed in a direction orthogonal to a brightness gradient in a portion other than an edge. In such a case, if filtering processing is performed with a large number of taps involving a wide range, an image quality is reduced. In contrast, however, in an edge portion, filtering processing performed in a wide range prevents occurrence of jaggies more reliably and thus forms a smooth edge.

Thus, in this embodiment, the number of taps for filtering processing is changed for each pixel. Thus, a range for smoothing processing in an edge direction is changed for each pixel. In addition, such a filtering range is changed in accordance with reliability of an edge in the edge direction vc. Therefore, a reduction in the image quality due to smoothing processing can be prevented.

Figure 5:
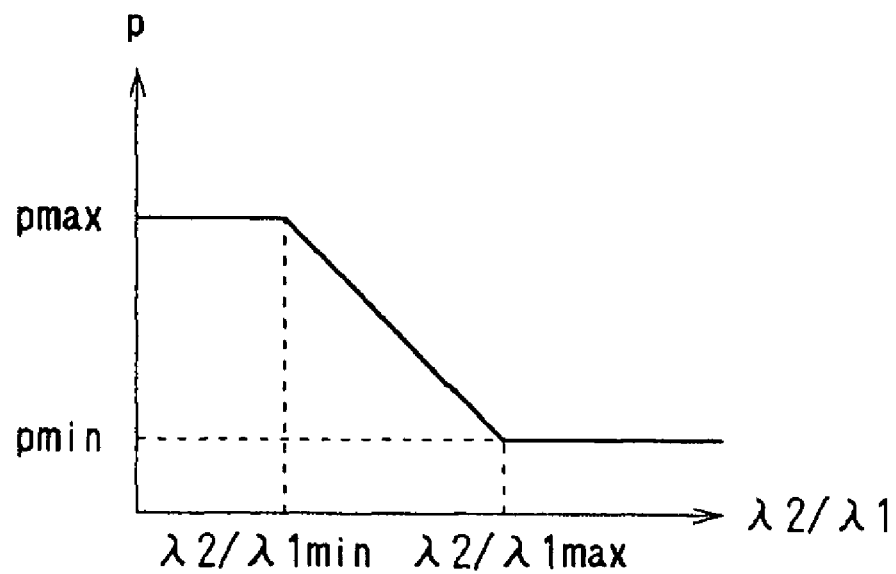
FIG. 5 is a characteristic curve diagram showing a parameter used for setting a smoothing processing range.

More specifically, in this embodiment, in accordance with the ratio λ2/λ1 of the eigenvalue λ2 for the edge direction v2 to the eigenvalue λ1 for the edge gradient direction v1, reliability of an edge in the edge direction vc is detected. In other words, if the ratio λ2/λ1 is small, it is determined that the pixel value gradient in the edge gradient direction v1 is predominant in this target pixel and that a stronger edge appears in the edge direction v2. Thus, as shown in FIG. 5, the edge direction processing range determination unit 6 generates a parameter p that increases substantially linearly in accordance with a decrease in the value of the ratio λ2/λ1 when the ratio λ2/λ1 is within a predetermined range between λ2/λ1min and λ2/λ1max and that exhibits the maximum value pmax or the minimum value pmin when the ratio λ2/λ1 is outside the predetermined range between λ2/λ1min and λ2/λ1max. Accordingly, the parameter p changing depending on reliability of an edge in an edge direction is generated.

Figure 6:
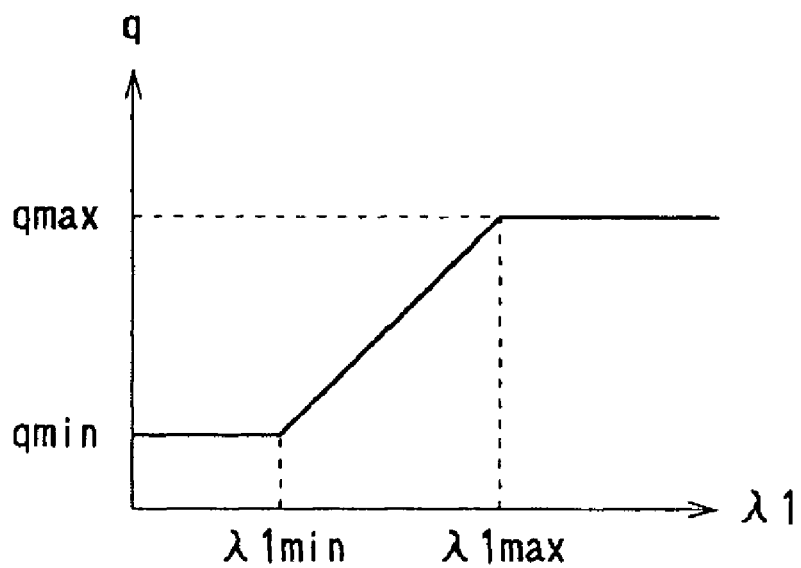
FIG. 6 is a characteristic curve diagram showing another parameter used for setting the smoothing processing range.

If the eigenvalue λ1 for the edge gradient direction v1 is large, the contrast across the edge is large. Thus, this edge is regarded as being a distinctive edge. Thus, as shown in FIG. 6, the edge direction processing range determination unit 6 generates a parameter q that increases substantially linearly in accordance with the eigenvalue λ1 in a predetermined range between λ1min and λ1max and that exhibits a lower limit value qmin or an upper limit value qmax in a range smaller or larger than the range between λ1min and λ1max. Accordingly, the parameter q changing in accordance with rising of an edge is generated.

The edge direction processing range determination unit 6 performs multiplication represented by the next condition for the two parameters p and q to calculate a filtering range r for the edge direction processing.

$$r = p \times q \quad (12)$$

In order to correspond to the sampling points of the image data D2 in the processing of the edge direction processing unit 5, the edge direction processing range determination unit 6 converts the eigenvalues λ1 and λ2 based on the sampling points of the image data D1 into eigenvalues based on the sampling points of the image data D2, and calculates a filtering range r. In this case, after a filtering range r is calculated from the sampling points of the image data D1, a filtering range r based on the sampling points of the image data D2 may be calculated by interpolation processing for the calculation result. In contrast, after the eigenvalues λ1 and λ2 based on the sampling points of the image data D2 are calculated by interpolating the eigenvalues λ1 and λ2 based on the sampling points of the image data D1, a filtering range r based on the sampling points of the image data D2 may be calculated from the calculation result.

Accordingly, the edge direction processing unit 5 changes the number of taps for the filtering processing in accordance with the range r calculated as described above, and calculates the pixel value Pc' of the target pixel Pc of the image data D2.

In such filtering processing, the edge direction processing unit 5 performs filtering processing based on the real number of taps by blending filtering processing results. Thus, the edge direction processing unit 5 overcomes unnaturalness in changing the number of taps when the filtering processing is performed based on the integral number of taps.

In other words, in the edge direction processing unit 5, a filter with the integral number of taps represented by the next condition is defined. Here, an odd number, such as 1, 3, 5, . . . , is applied as the integral number of taps.

$$n_{integer}^{-1} = \text{floor}(n_{real})$$

$$n_{integer}^{+1} = \text{ceil}(n_{real}) \quad (13)$$

Here, "floor(n)" represents the maximum integral number of taps not exceeding n, and "ceil(n)" represents the minimum integral number of taps larger than n. In addition, the range r calculated based on condition (12) is applied to "nreal". Thus, when n is 3.5, the number of taps "floor(n)" is 3, and the number of taps "ceil(n)" is 5.

Blending of the filtering processing results is performed by calculating a filtering processing result f(n) based on a real number by performing arithmetic processing represented by the next condition using the two types of filtering processing results. Thus, the edge direction processing unit 5 calculates the pixel value Pc' of the target pixel Pc of the image data D2 by performing filtering processing based on the two types of tap numbers in the filtering range r and by further performing arithmetic processing represented by condition (14) using the two types of filtering processing results. Accordingly, the edge direction processing unit 5 calculates the pixel value Pc' of the target pixel Pc of the image data D2 by performing filtering processing based on the number of taps corresponding to reliability of an edge in an edge direction, and changes the number of taps in a decimal fractional part.

$$f(n) = \alpha f(n_{integer}^{-1}) + (1-\alpha) f(n_{integer}^{+1}) \quad (14)$$

here, $\alpha = (n_{integer}^{+1} - n_{real})/2$

Figure 7:
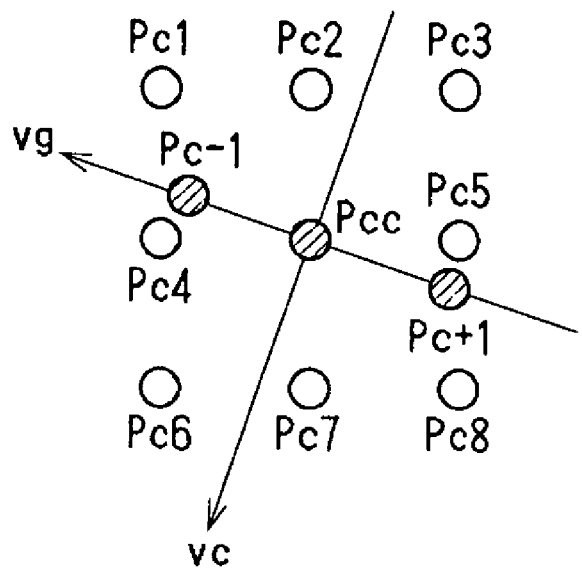
FIG. 7 is a schematic diagram used for explaining an operation of an edge gradient direction processing unit.

An edge gradient direction processing unit 7 performs edge enhancement processing in the edge gradient direction v1 using the pixel value Pc' of the target pixel Pc of the image data D2 calculated as described above by the edge direction processing unit 5. In other words, as shown in FIG. 7, the edge gradient direction processing unit 7 calculates an edge gradient direction vg for a target pixel Pcc of the image data D2 in accordance with the edge gradient direction v1 based on adjacent sampling points of the image data D1, as in calculation of the edge direction vc for the target pixel Pc of the image data D2 performed by the edge direction processing unit 5.

In addition, in accordance with the edge gradient direction vg for the target pixel Pcc calculated as described above, the edge gradient direction processing unit 7 sets a predetermined number of sampling points Pc−1 and Pc+1 based on a sampling pitch in the image data D2 from the sampling points for the target pixel Pcc on a line in the edge gradient direction vg. In addition, the edge gradient direction processing unit 7 calculates pixel values of the sampling points Pc−1 and Pc+1 and the target pixel Pcc by an interpolation operation using pixel values output from the edge direction processing unit 5. Accordingly, in accordance with detection results of the edge detection unit 2, the edge gradient direction processing unit 7 generates interpolated image data in the edge gradient direction obtained by interpolation processing for the image data based on the pixel values output from the edge direction processing unit 5 on a line extending in the edge gradient direction vg for each pixel of the output image data D2.

Then, the edge gradient direction processing unit 7 performs filtering processing on the pixel values of the sampling points Pc−1 and PC+1 and the target pixel Pcc calculated as described above, and determines a pixel value Pcc' of the target pixel Pcc. In the example shown in FIG. 7, a case where the pixel value Pcc' of the target pixel Pcc is calculated using three taps is described. The pixel value of the sampling point Pc−1 is generated by linear interpolation based on peripheral sampling points Pc1, Pc2, Pc4, and Pcc, and the pixel value of the sampling point Pc+1 is generated by linear interpolation based on peripheral sampling points Pcc, Pc5, Pc7, and Pc8. Accordingly, the edge gradient direction processing unit 7 performs edge enhancement in the direction that crosses the edge. In such an interpolation operation for generating interpolated image data, linear interpolation using pixel values of adjacent neighboring pixels need not be performed, and interpolation operation methods using various peripheral pixels are widely applicable. In addition, as arithmetic processing for filtering processing using such interpolated image data, interpolation operations using various weighting coefficients are widely applicable.

An interpolation processing unit 8 converts a resolution of the image data D1, for example, by linear interpolation or bicubic conversion, and outputs a pixel value Pa based on a sampling pitch corresponding to the image data D2.

A blend ratio determination unit 9 generates a weighting coefficient for blending in accordance with reliability of an edge in the edge direction vc. In other words, when smoothing processing is performed in the edge direction and edge enhancement is performed in a direction orthogonal to the edge, unnatural edge enhancement may occur in a natural image. Thus, in this embodiment, a blend processing unit 10 performs weighting addition of the pixel value Pa of the image data D2 generated by the interpolation processing unit 8 using a known procedure and the pixel value Pcc' generated by the edge gradient direction processing unit 7 in order to generate the image data D2, and the blend ratio determination unit 9 changes the weighting coefficient for the weighting addition processing. In addition, the blend ratio determination unit 9 changes the weighting coefficient in accordance with reliability of an edge in an edge direction, and this prevents excessive unnaturalness in processing for the edge. In addition, the ratio $\lambda 2/\lambda 1$ of the eigenvalue $\lambda 2$ for the edge direction v2 to the eigenvalue $\lambda 1$ for the edge gradient direction v1 is applied to the reliability of the edge in the edge direction.

Figure 8:
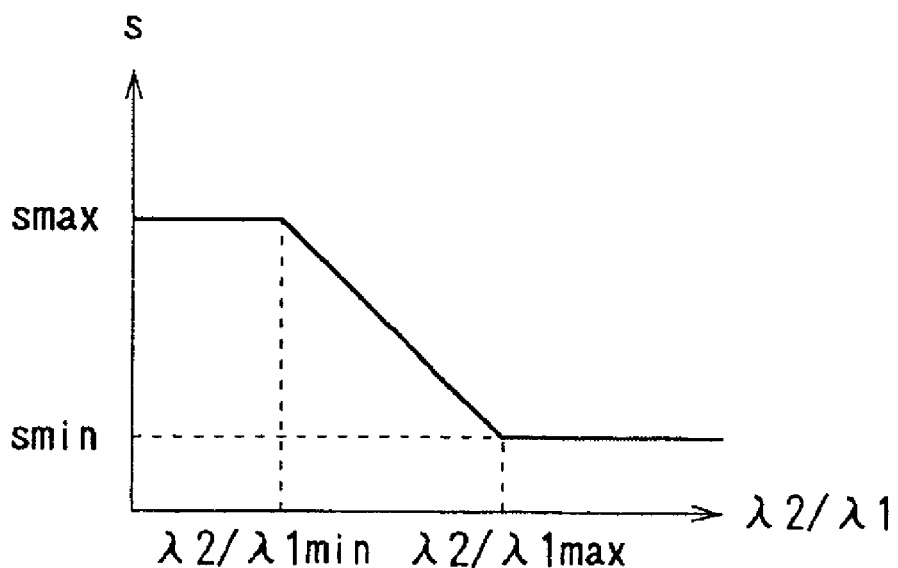
FIG. 8 is a characteristic curve diagram showing a parameter used for setting a blend processing unit.

More specifically, if the ratio $\lambda 2/\lambda 1$ is small, it is determined that the gradient in the edge gradient direction v1 is predominant in this target pixel and that a stronger edge appears in the edge direction v2. Thus, as shown in FIG. 8, the blend ratio determination unit 9 generates a parameter s that increases substantially linearly in accordance with a decrease in the value of the ratio $\lambda 2/\lambda 1$ when the ratio $\lambda 2/\lambda 1$ is within a predetermined range between $\lambda 2/\lambda 1 \min$ and $\lambda 2/\lambda 1 \max$ and that exhibits the maximum value smax or the minimum value smin when the ratio $\lambda 2/\lambda 1$ is outside the predetermined range between $\lambda 2/\lambda 1 \min$ and $\lambda 2/\lambda 1 \max$. Accordingly, the parameter s changing depending on reliability of an edge in an edge direction is generated.

Figure 9:
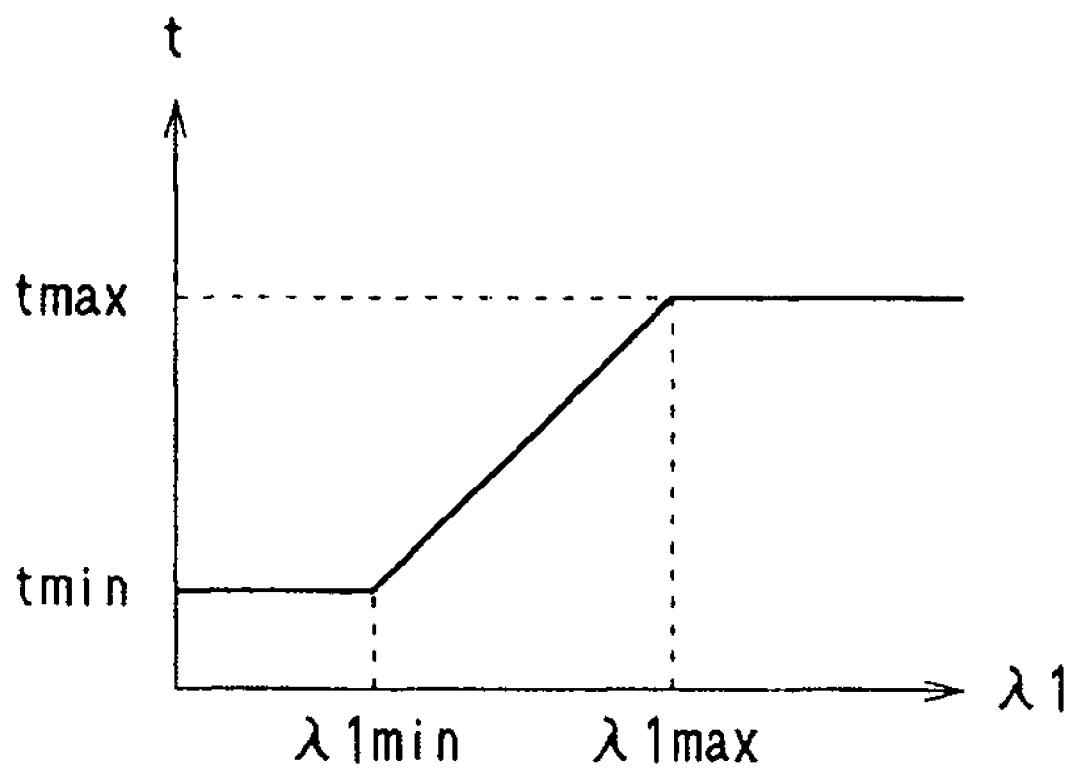
FIG. 9 is a characteristic curve diagram showing another parameter used for setting the blend processing unit.

If the eigenvalue $\lambda 1$ for the edge gradient direction v1 is large, the contrast across the edge is large. Thus, this edge is regarded as being a distinctive edge. Thus, as shown in FIG. 9, the blend ratio determination unit 9 generates a parameter t that increases substantially linearly in accordance with the eigenvalue $\lambda 1$ in a predetermined range between $\lambda 1 \min$ and $\lambda 1 \max$ and that exhibits a lower limit value tmin or an upper limit value tmax in a range outside the range between $\lambda 1 \min$ and $\lambda 1 \max$. Accordingly, the parameter t changing in accordance with rising of an edge is generated.

The blend ratio determination unit 9 performs multiplication represented by the next condition for the two parameters s and t to calculate a weighting coefficient β for blending ($0 \leq \beta \leq 1$).

$$\beta = s \times t \tag{15}$$

In order to correspond to the sampling points of the image data D2, the blend ratio determination unit 9 converts the eigenvalues $\lambda 1$ and $\lambda 2$ based on the sampling points of the image data D1 into eigenvalues based on the sampling points of the image data D2, and calculates a weighting coefficient α for blending. In this case, after a weighting coefficient α for blending is calculated from the sampling points of the image data D1, a weighting coefficient α for blending based on the sampling points of the image data D2 may be calculated by interpolation processing for the calculation result. In contrast, after the eigenvalues $\lambda 1$ and $\lambda 2$ based on the sampling points of the image data D2 are calculated by interpolating the eigenvalues $\lambda 1$ and $\lambda 2$ based on the sampling points of the image data D1, a weighting coefficient β for blending based on the sampling points of the image data D2 may be calculated from the calculation result.

The blend processing unit 10 performs weighting addition of image data S3 based on the pixel value Pcc' calculated by the edge gradient direction processing unit 7 and image data S11 based on the pixel value Pa calculated by the interpolation processing unit 8 using the weighting coefficient β obtained by the blend ratio determination unit 9 by performing arithmetic processing represented by the next condition, and outputs the processing result as the image data D2.

$$S4 = \beta \times S3 + (1-\beta) \times S11 \tag{16}$$

(2) Operation of Embodiment

With the foregoing configuration, the input image data D1 (FIG. 1) is input to the edge detection unit 2. In the edge detection unit 2, the edge gradient direction v1 with the largest gradient of pixel values and the edge direction v2 orthogonal to the edge gradient direction v1 are sequentially detected for each pixel (FIGS. 2 and 3). In addition, the input image data D1 is input to the edge direction processing unit 5. In the edge direction processing unit 5, the image data is smoothed in the edge direction v2 for each pixel of the output image data D2 in accordance with a detection result of the edge detection unit 2, and a pixel value Pc corresponding to each pixel of the output image data D2 is sequentially calculated. In addition, the pixel value Pc is input to the edge gradient direction processing unit 7 in accordance with a calculation result. In the edge gradient direction processing unit 7, in accordance with the detection result of the edge detection unit 2, edge enhancement is performed in the edge gradient direction v1 for each pixel of the output image data D2, and a pixel value of the output image data D2 is calculated. Accordingly, since the input image data D1 is smoothed in the edge direction v2, occurrence of jaggies can be effectively avoided. In addition, edge enhancement is performed in the edge gradient direction v1 orthogonal to the edge direction v2. Thus, high-frequency components are enhanced in the direction orthogonal to the edge direction. Therefore, conversion into the image data D2 is performed while effectively avoiding loss of high-frequency components and preventing occurrence of jaggies.

By performing a series of processing as described above, concerning the input image data D1, in the edge direction processing unit 5 (FIG. 4), interpolated image data Pc in the edge direction based on interpolation processing for the input image data D1 is generated for each pixel of the output image data D2 on a line extending in the edge direction v2 in accordance with a detection result of the edge detection unit 2, and the pixel value Pc' corresponding to each pixel of the output image data D2 is sequentially calculated by filtering processing of the interpolated image data Pc in the edge direction generated as described above. Accordingly, by setting a characteristic for the filtering processing, smoothing processing is performed in the edge direction v2, and occurrence of jaggies can be effectively avoided.

Concerning the input image data D1, in the edge detection unit 2, the gradient matrix generation unit 3 generates a brightness gradient matrix G for each pixel, and the subsequent eigenvalue and eigenvector detection unit 4 processes this brightness gradient matrix G to detect the edge gradient direction v1 and the edge direction v2. At the same time, the eigenvalues λ1 and λ2 representing dispersions of pixel value gradients for the edge gradient direction v1 and the edge direction v2 are also calculated.

From among calculation results of the edge detection unit 2, for the eigenvalues λ1 and λ2, the ratio λ2/λ1 of the eigenvalue λ2 to the eigenvalue λ1 is calculated by the edge direction processing range determination unit 6. The ratio λ2/λ1 decreases as the pixel gradient in the edge gradient direction is more predominant. Accordingly, reliability of an edge is detected. Thus, in the edge direction processing range determination unit 6, the parameter p representing the reliability of the edge is generated in accordance with the ratio λ2/λ1 (FIG. 5). Thus, in this embodiment, the reliability of the edge is calculated by effectively using the gradient matrix g used for calculation of the edge gradient direction v1 and the edge direction v2. In addition, since the eigenvalue λ1 represents the strength of the edge, the parameter q corresponding to the parameter p is generated in accordance with the eigenvalue λ1 (FIG. 6). In addition, the filtering range r is calculated by multiplication of the parameters p and q.

Concerning the input image data D1, when the edge direction processing unit 5 performs filtering processing on the interpolated image data Pc in the edge direction to generate the pixel value Pc' of the output image D2, the number of taps for the filtering processing is changed in accordance with the filtering range r generated by the edge direction processing range determination unit 6 as described above. If the reliability of the edge is high, the pixel value Pc' of the output image data D2 is generated by performing filtering processing on the interpolated image data Pc in the edge direction in a wide range. If the reliability of the edge is low, the pixel value Pc' of the output image data D2 is generated by performing filtering processing in a narrow range. Thus, for the input image data D1, the number of taps for the filtering processing for the edge direction v2 is changed in accordance with the reliability of the edge. Thus, excessive smoothing processing in a portion other than the edge can be prevented, and a reduction in the image quality can be effectively avoided.

In addition, by performing smoothing processing as described above, for the image data D1, the weighting coefficient α for filtering processing is changed (condition (12)) in accordance with the reliability of the edge in the edge direction v2. In addition, by performing weighting addition of filtering processing results with different numbers of taps using the weighting coefficient α (condition (14)), the number of taps is changed in a decimal fractional part. Thus, unnaturalness in changing the integral number of taps is overcome.

Concerning the image data obtained by calculation in the edge direction processing unit 5, in the edge gradient direction processing unit 7, in accordance with a detection result of the edge detection unit 2, interpolated image data Pcc in the edge gradient direction obtained by interpolation processing for the image data based on the pixel values output from the edge direction processing unit 5 is generated for each pixel of the output image data D2 on a line extending in the edge gradient direction v1 (FIG. 7), and the pixel value Pcc' of the output image data D2 is calculated by performing filtering processing of the interpolated image data Pcc in the edge gradient direction. Accordingly, by setting a characteristic for the filtering processing, edge enhancement is performed in the edge gradient direction v1, and the image data D2 is generated.

For output data of the edge gradient direction processing unit 7 generated as described, however, when the image data D1 based on a natural image is processed, the outline may be excessively enhanced. Thus, for the image data D1, the interpolation processing unit 8 calculates a pixel value Pa' for each pixel of the output image data D2 by interpolation processing in accordance with a known procedure. Accordingly, although high-frequency components of the image data S11 generated by the interpolation processing unit 8 based on the known procedure are lost, the outline of the image data S11 is not excessively enhanced.

For the image data D1, the blend processing unit 10 performs weighting addition of the image data S11 from the interpolation processing unit 8 and the image data S3 from the edge gradient direction processing unit 7 in accordance with an image to generate the output image data D2. Thus, a portion in which the outline is excessively enhanced is corrected using a pixel value Pa' in accordance with the known procedure, and the output image data D2 is generated. Therefore, in this embodiment, a reduction in the image quality due to excessive edge enhancement can be prevented.

In this embodiment, similarly to a case where the filtering range r is calculated in the edge direction processing range determination unit 6, the reliability of an edge is calculated using the ratio λ2/λ1 of the eigenvalue λ2 to the eigenvalue λ1, and the weighting coefficient β for weighting addition performed in the blend processing unit 10 is calculated in accordance with the reliability of the edge (FIG. 8). In addition, the weighting coefficient β is corrected using the eigenvalue λ1 (FIG. 9). Thus, in this embodiment, in such processing for preventing excessive edge enhancement, the gradient matrix g used for calculating the edge gradient direction v1 and the edge direction v2 is effectively used to calculate the reliability of the edge, and the weighting coefficient β is set in accordance with the reliability of the edge. Thus, excessive edge enhancement can be prevented with such a simplified configuration.

(3) Effects of Embodiment

With the foregoing configuration, the edge gradient direction v1 with the largest gradient of pixel values and the edge direction v2 orthogonal to the edge gradient direction v1 are detected, and edge enhancement and smoothing processing are performed in the edge gradient direction v1 and the edge direction v2, respectively, to generate the output image data D2. Thus, loss of high-frequency components can be effectively avoided and occurrence of jaggies can be prevented.

In filtering processing for such smoothing processing, after the interpolated image data Pc in the edge direction obtained by interpolation processing for the input image data D1 is generated for each pixel of the output image data D2 on a line extending in the edge direction v2 in accordance with a detection result of the edge detection unit 2, the pixel value Pc' corresponding to each pixel of the output image data D2 is sequentially detected by performing filtering processing of the interpolated image data Pc in the edge direction. Accordingly, a characteristic for the filtering processing is variously set, and smoothing processing with a desired characteristic can thus be performed.

In addition, the number of taps for the filtering processing is changed in accordance with the reliability of the edge in the edge direction v2. Thus, incorrect smoothing processing in a portion other than the edge can be prevented.

In addition, the weighting coefficient α for the filtering processing is changed in accordance with the reliability of the edge in the edge direction v2, and the number of taps is changed in a decimal fractional part by performing weighting addition of filtering processing results of different numbers of taps using the weighting coefficient α for the filtering processing. Thus, by changing the number of taps as described above, unnaturalness in changing the integral number of taps can be effectively avoided.

In addition, since the reliability of the edge in the edge direction v2 is the ratio of the dispersion λ2 of the pixel value gradient in the edge direction v2 to the dispersion λ1 of the pixel value gradient in the edge gradient direction v1, the configuration for detecting the edge gradient direction v1 and the edge direction v2 is effectively used, and unnaturalness in changing the number of taps can be effectively prevented.

In contrast, after the interpolated image data Pcc in the edge gradient direction obtained by interpolation processing for the image data Pc based on the pixel value Pc' output from the edge direction processing unit 5 is generated for each pixel of the output image data D2 on a line extending in the edge gradient direction v1 in accordance with a detection result of the edge detection unit 2, processing of edge enhancement is performed by filtering processing of the interpolated data Pcc in the edge gradient direction. Thus, a characteristic for the filtering processing is variously set, and edge enhancement with a desired characteristic can thus be performed.

In addition, a series of processing is performed such that a sampling pitch in the output image data D2 is different from a sampling pitch in the input image data D1, and sampling pitches are changed together in smoothing processing and edge enhancement processing. The interpolation processing unit 8 converts the input image data D1 into the interpolated image data S11. The weighting coefficient β for blending is changed in accordance with the reliability of the edge in the edge direction v2. Weighting addition of the image data S3 output from the edge gradient direction processing unit and the interpolated image data S11 is performed in accordance with the weighting coefficient β for blending, and the output image data D2 is output. Accordingly, excessive edge enhancement in a natural image can be effectively prevented.

(4) Other Embodiments

Although a case where a smoothing processing range in an edge direction is changed in accordance with a change of the number of taps has been described in the foregoing embodiment, the present invention is not limited to this. The number of taps may be equally changed in accordance with a change in a weighting coefficient for smoothing processing.

In addition, although a case where a smoothing processing range and weighting addition performed in the blend processing unit are changed in accordance with the ratio of the eigenvalue λ2 to the eigenvalue λ1 and the eigenvalue λ1 has been described in the foregoing embodiment, the present invention is not limited to this. When a practically sufficient characteristic can be ensured, such changes may be made in accordance with only the ratio of the eigenvalue λ2 to the eigenvalue λ1. In addition, instead of detection of the reliability of the edge in accordance with the ratio of the eigenvalue λ2 to the eigenvalue λ1 and the eigenvalue λ1, various edge detection methods may be applied. In addition, since excessive edge correction for weighting addition performed by the blend processing unit occurs in a point, for example, in which leaves of a tree grows close together, in a natural image, such changes may be made in accordance with, for example, a characteristic of each portion of the image detected as a frequency characteristic or the like.

In addition, although a case where a smoothing processing range and weighting addition performed by the blend processing unit are changed has been described in the foregoing embodiment, the present invention is not limited to this. When a practically sufficient characteristic can be ensured, such processing may be omitted. Moreover, one of such processing or both of such processing may be omitted depending on the type of an image.

In addition, although a case where an image is magnified or reduced by changing a sampling pitch in the input image data D1 has been described in the foregoing embodiment, the present invention is not limited to this. The present invention is also widely applicable to processing for edge correction. In this case, in the edge direction processing unit and the edge gradient direction processing unit, a series of processing is performed in accordance with a sampling pitch of output image data that is equal to a sampling pitch of the input image data. In addition, the configuration for interpolation processing is omitted, and the blend processing unit 10 performs weighting addition of output data of the edge gradient direction processing unit 7 and the input image data. Thus, edge enhancement of input image data can be simply performed.

In addition, although a case where arithmetic processing means performs a predetermined program to process image data has been described in the foregoing embodiment, the present invention is not limited to this. The present invention is also widely applicable to a case where image data is processed with hardware configuration.

INDUSTRIAL APPLICABILITY

The present invention is applicable, for example, to resolution conversion.

The invention claimed is:

1. An image processing apparatus for processing input image data and for outputting output image data, the image processing apparatus comprising:
   an edge detection unit for detecting, for pixels of the input image data, an edge gradient direction with the largest gradient of pixel values and an edge direction orthogonal to the edge gradient direction, setting a number of sampling points on a line in the edge direction, and generating sampling pixel values for the sampling points by interpolation;
   an eigenvalue and eigenvector detection unit for detecting eigenvalues for the edge direction and the edge gradient direction, and calculating a reliability ratio of an edge in the edge direction with the eigenvalues;
   an edge direction processing unit for smoothing the input image data in the edge direction, including the sampling pixel values, by filtering the pixel values, and outputting smoothed pixel values; and
   an edge gradient direction processing unit for enhancing the input image data in the edge gradient direction and for outputting enhanced pixel values;
   wherein the edge direction processing unit calculates a filtering range by multiplying the reliability ratio by an eigenvalue of the edge gradient direction, and changes a number of taps for the filtering based on the calculated filtering range.

2. The image processing apparatus according to claim 1, wherein the number of taps for the filtering is changed in a decimal fractional part by changing a weighting coefficient based on the reliability ratio, and by performing weighting addition of filtering results of different numbers of taps using the weighting coefficient.

3. The image processing apparatus according to claim 1, wherein the reliability ratio is a ratio of a dispersion of the gradient of the pixel values in the edge direction to a dispersion of the gradient of the pixel values in the edge gradient direction.

4. The image processing apparatus according to claim 1, wherein the edge gradient direction processing unit sets a number of gradient sampling points on a line in the edge gradient direction, generates gradient sampling pixel values for the gradient sampling points by interpolation, and performs filtering on the gradient sampling pixel values.

5. The image processing apparatus according to claim 1, wherein the output image data is image data obtained by changing a sampling pitch of the input image data, and wherein the image processing apparatus further includes:

an interpolation processing unit for performing interpolation on the input image data and for outputting interpolated image data with a sampling pitch of the output image data;

a blend ratio determination unit for changing a weighting coefficient for blending based on the reliability ratio; and a blend processing unit for performing weighting addition of the image data output from the edge gradient direction processing unit and the interpolated image data using the weighting coefficient for blending, and for outputting the output image data.

6. The image processing apparatus according to claim 1, further comprising:

a blend ratio determination unit for changing a weighting coefficient for blending based on the reliability ratio of an edge in the edge direction; and a blend processing unit for performing weighting addition of the enhanced pixel values and the input image data using the weighting coefficient for blending, and for outputting the output image data.

7. An image processing method for processing input image data and for outputting output image data, the image processing method comprising: using a computer to perform the steps of detecting, for pixels of the input image data, an edge gradient direction with the largest gradient of pixel values and an edge direction orthogonal to the edge gradient direction for;

setting a number of sampling points on a line in the edge direction;

generating sampling pixel values for the sampling points by interpolation;

detecting eigenvalues for the edge direction and the edge gradient direction, and calculating a reliability ratio of an edge in the edge direction with the eigenvalues;

smoothing the input image data in the edge direction, including the sampling pixel values, by filtering the pixel values and outputting smoothed pixel values;

enhancing the input image data in the edge gradient direction and outputting enhanced pixel values;

calculating a filtering range by multiplying the reliability ratio by an eigenvalue of the edge gradient direction; and changing a number of taps for the filtering based on the calculated filtering range.

8. A computer-readable recording medium storing a program for an image processing method performed by arithmetic processing means for processing input image data and for outputting output image data, the program for the image processing method comprising:

detecting, for pixels of the input image data, an edge gradient direction with the largest gradient of pixel values and an edge direction orthogonal to the edge gradient direction for;

setting a number of sampling points on a line in the edge direction;

generating sampling pixel values for the sampling points by interpolation;

detecting eigenvalues for the edge direction and the edge gradient direction, and calculating a reliability ratio of an edge in the edge direction with the eigenvalues;

smoothing the input image data in the edge direction, including the sampling pixel values, by filtering the pixel values and outputting smoothed pixel values;

enhancing the input image data in the edge gradient direction and outputting enhanced pixel values;

calculating a filtering range by multiplying the reliability ratio by an eigenvalue of the edge gradient direction; and changing a number of taps for the filtering based on the calculated filtering range.

* * * * *